(No Model.)

C. E. PUGSLEY.
ROPE CLAMP.

No. 506,441.  Patented Oct. 10, 1893.

Witnesses
Chas H Smith
J. Staib

Inventor
Charles E. Pugsley
per Lemuel W. Serrell
Atty.

UNITED STATES PATENT OFFICE.

CHARLES E. PUGSLEY, OF NEW YORK, N. Y.

ROPE-CLAMP.

SPECIFICATION forming part of Letters Patent No. 506,441, dated October 10, 1893.

Application filed March 27, 1893. Serial No. 467,684. (No model.)

*To all whom it may concern:*

Be it known that I, CHARLES E. PUGSLEY, a citizen of the United States, residing in the city and State of New York, have invented an Improvement in Rope-Clamps, of which the following is a specification.

This clamp is especially intended for use with dumb waiters so as to hold such dumb waiter and the articles upon the same at any desired place, and such clamp is easily released for allowing the waiter to be moved, but this clamp can be employed under other circumstances.

I make use of pawls standing in opposite directions with their adjacent ends grooved for the rope to pass between them, and the outer and lower ends of the pawls are pivoted in a suitable supporting frame and there is a slotted arm projecting from one of the pawls and receiving a pin or screw in the other pawl, whereby the two pawls are retained in their proper relative positions and the pawls are moved away from the rope so as to liberate the same by a connection that acts upon one of the pawls, and it is advantageous to employ a counterpoise for raising the pawls when the strain upon the rope is relieved.

Figure 1:
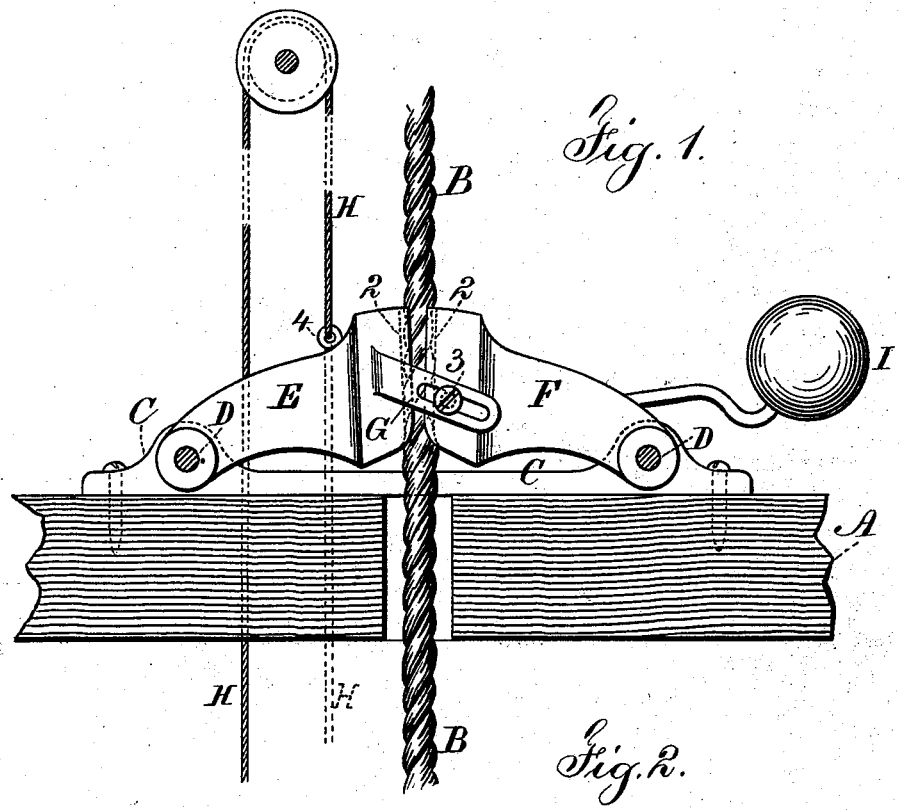
Figure 2:
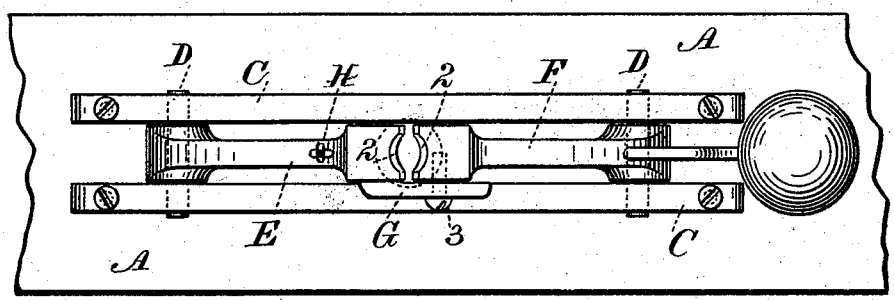

In the drawings, Figure 1 is a vertical section of the support and an elevation of the pawls, and Fig. 2 is a plan view of the clamp complete.

A support of any suitable character is provided as at A, and through this is an opening for the rope B.

The frame C is of suitable size and shape and rests upon the support A and it is provided with the pivot pins D for the pawls E and F, and the moving ends or faces of these pawls are grooved as at 2 so as to be adapted to receive between them the rope B, and the faces at the ends of the pawls E and F are parallel or nearly so, in order to properly grasp and clamp the rope, and being above the pivot pins D the strain upon the rope causes the ends of the pawls to grip or clamp the rope with a force proportioned to the strain upon the rope, thereby insuring a hold of the rope as great as the strength of the rope, so that the rope will be as liable to break as to slip, and in order to cause the two pawls to move in unison with each other, I provide a projecting slotted guide G attached to the side of one of the pawl heads and receiving a pin or screw 3 in the other of such pawl heads, so that neither of the pawls can be moved without moving the other but at the same time the divergent movement of the pawl heads as the grip upon the rope is released, is provided for. There may be an eye 4 upon one of the pawls with a cord or rope H passing up over a pulley so that the pawls can be lifted by drawing down upon such cord H, thereby causing the pawls to slacken their hold upon the rope, and if desired a counterweight I may be provided, and where such counterweight is greater than the pawls, the pawls may remain open in their normal condition, and in that case the cord or rope H can be made use of as shown by dotted lines in Fig. 1, to pull down the pawls and cause them to clamp the rope, and the weight upon the rope will cause the clamps to retain their hold until such time as the weight upon the rope is released or partially so to allow the counterweight to open the pawls. When this clamping device is turned bodily up-side-down so as to be placed below the support A instead of above it, the same is adapted to a rope which is to be stopped by the clamp as it may be moving upwardly. In this case the counterweight I acts, to keep the pawl faces up toward the rope so as to cause the friction of the moving rope to tighten the rope clamp against the rope, and the clamps will be liberated by pulling on the rope passing down from the eye 4.

I claim as my invention—

1. The combination in a clamp for a dumb waiter or other rope, of two opposite pawls, a stationary supporting frame for such pawls, pivots passing through the frame and through the ends of the pawls, the faces of the pawls being adapted to clamp the rope, and a projection from one pawl engaging the other pawl so that the two swing together as they are opened from the rope or draw together by the action of the rope upon the faces of the pawls, substantially as set forth.

2. The combination with the frame C and pivot pins D, of the pawls E and F having grooved faces to act at opposite sides of the rope, and the slotted guide G fastened to the side of one of the pawl faces, and a pin or screw upon the other pawl passing into the slot, substantially as set forth.

3. The combination with the frame C and pivoted pawls having grooved faces, of a slotted guide G connected with one of the pawls, the pin 3 upon the other pawl and passing into the slot of the guide, an eye upon one of the pawls and a cord by which such pawl can be moved, substantially as set forth.

4. The combination with the frame C and pivots D, of the pawls E and F having grooved faces for clamping a rope, the slotted guide G connected with one of the pawls and receiving a pin upon the other pawl, and a counterweight that tends to lift the pawls, substantially as set forth.

Signed by me this 23d day of March, 1893.

CHARLES E. PUGSLEY.

Witnesses:
 GEO. T. PINCKNEY,
 A. M. OLIVER.